United States Patent [19]

Shen

[11] 4,395,730

[45] Jul. 26, 1983

[54] AUTOMATIC COLOR-TEMPERATURE COMPENSATION DEVICE

[76] Inventor: Chou-Ming Shen, 4F-2, No. 65, An Ho Rd., Taipei, Taiwan

[21] Appl. No.: 314,514

[22] Filed: Oct. 23, 1981

[30] Foreign Application Priority Data

May 26, 1981 [TW] Taiwan ............................... 7023018

[51] Int. Cl.$^3$ ............................................ H04N 9/535
[52] U.S. Cl. ...................................................... 358/29
[58] Field of Search ........................ 358/29, 41, 50, 55, 358/21 R

[56] References Cited

U.S. PATENT DOCUMENTS

| 3,627,911 | 12/1971 | Kubota | 358/29 |
| 3,877,068 | 4/1975 | Kosaka | 358/29 |
| 4,123,775 | 10/1978 | Bugni | 358/29 |
| 4,218,699 | 8/1980 | Dischert | 358/29 |
| 4,308,551 | 12/1981 | Ohnuma | 358/29 |

FOREIGN PATENT DOCUMENTS

| 54-158127 | 12/1979 | Japan | 358/29 |
| 56-4993 | 1/1981 | Japan | 358/29 |
| 56-90688 | 7/1981 | Japan | 358/29 |

Primary Examiner—Michael A. Masinick
Attorney, Agent, or Firm—Armstrong, Nikaido, Marmelstein & Kubovcik

[57] ABSTRACT

An automatic color-temperature compensation device for television cameras, comprising three filters adapted to pass color rays of the three primary colors, or red, green and blue rays of light from the surroundings, three sensors respectively adapted to detect the red, green and blue rays and to produce an electric signal in response to the detected red, green and blue rays respectively; three log amplifiers for amplifying respective electrical signals; two ratio circuit devices each adapted to compare two of the three electrical signals and produce a ratio output in response to the ratio difference of the two compared electrical signals; two anti-log amplifiers to respectively amplify the two ratio outputs; two comparators for respectively comparing the two amplified ratio outputs with two reference voltages which are so selected as to be equal to the respective ratio outputs at a predetermined color temperature, say 3200° K.; the comparators each being adapted to produce a control signal in response to the respective, compared two ratio outputs to be applied to respective gain controlling circuits of two of three signal systems of the camera system to make up or to offset the "gains" of two signals decreased or increased because of the change in color temperature from what was pre-determined, so that the camera system operates as if it were at the pre-determined color temperature.

5 Claims, 9 Drawing Figures

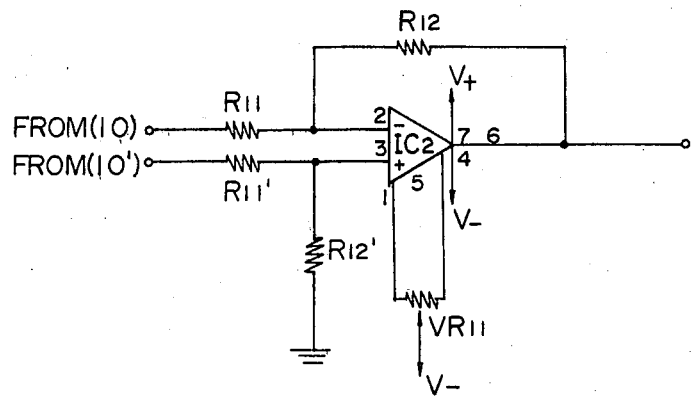
FIG. 6
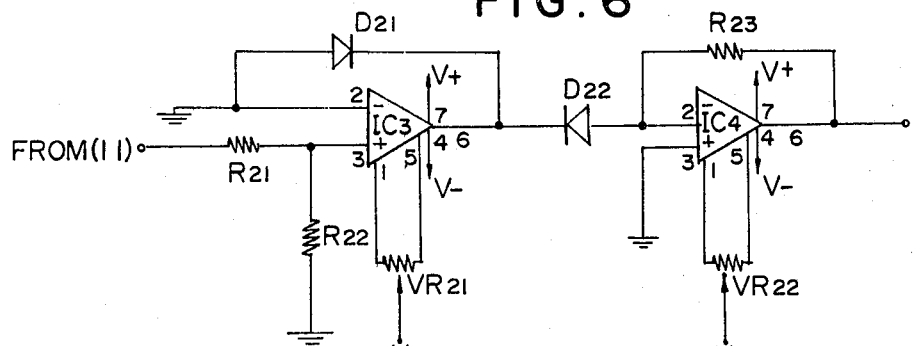
FIG. 7
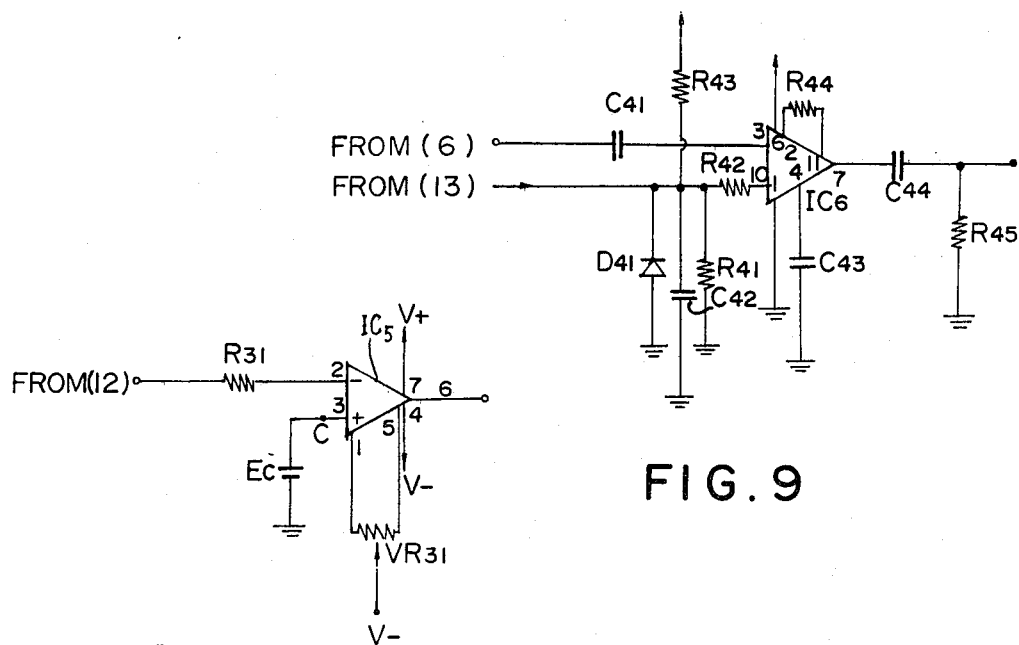
FIG. 8
FIG. 9

AUTOMATIC COLOR-TEMPERATURE COMPENSATION DEVICE

BACKGROUND OF THE INVENTION

Brief Description of Prior Art

In photographing scenes or scenery with an electronic camera such as a television camera, one has to selectively use a number of various color filters to compensate for the color temperature that varies with the types of the light sources used in the studio in case of photographying in a studio, or that varies with the time of day in case of photographying in the field. Such changes of color temperature are shown in Table 1.

TABLE 1

| Color Temperature of Various Light Sources | |
|---|---|
| Light Source | Color Temperature |
| Standard Candle Light | 1,800°–1,900° K. |
| 100 W Tungsten Filament Bulb | 2,500°–2,800° K. |
| Photo-Flood Light | 3,000°–3,400° K. |
| Arc Light | 4,000°–5,500° K. |
| Stolobo Flash Light | 4,500°–6,500° K. |
| Sunlight at dawn or sunset | 2,000° K. |
| 30 minutes before sunset or after dawn | 2,900° K. |
| 1 hour before sunset or after dawn | 3,500° K. |
| 1.5 hours before sunset or after dawn | 4,000° K. |
| 2 hours before sunset or after dawn | 4,400° K. |
| Sunlight (average) | 5,400° K. |
| Sunlight (9:00 AM to 3:00 PM) | 5,450°–5,800° K. |
| Sunlight, at noon of clear day | 6,000°–6,500° K. |
| Cloudy sky | 6.500°–7,000° K. |
| Clear Blue sky | 10,000°–20,000° K. |

In addition, a procedure referred to as "white balance adjustment" is often required.

A typical, conventional television camera is schematically shown in FIG. 1. In the drawing, 1 is an object lens; 2 is a filter which is selected according to the color temperature of the studio (or field) that can be measured with a conventional color temperature meter; 3 is a prism for dividing the light coming through lens 1 and filter 2 into three components; 4, 4′ and 4″ are respectively red, green and blue filters that only allow red, green and blue rays to pass therethrough respectively; 5, 5′ and 5″ are pick-up tubes adapted to receive the red, green and blue rays and to produce a signal in response to the received red, green and blue rays respectively. FIG. 2 shows a block diagram of the camera system wherein 6, 6′ and 6″ and 7, 7′ and 7″ are amplifiers for amplifying the signals produced by camera tubes 5, 5′ and 5″. The amplified signals are delivered to encoder 16 whereby the amplified signals are converted into complex video signals. The amplified signals from amplifiers 7, 7′ and 7″ are also delivered to differential amplifiers 8 and 8′ which respectively compare two of the three amplified signals, and produce a differential signal to be sent back to the corresponding amplifiers 6 and 6″ respectively so as to automatically adjust the "white balance" of the camera system when switch SW₁ is closed.

The white balance adjustment is performed by photographing a Gray Scale Chart having a graduation of white to black in progressive increments of darkness. While photographying the Gray Scale Chart filter 2 is selected so as to equalize the amplified signals to be delivered to encoder 16.

In this arrangement filter 2 must be changed whenever the color temperature changes, and the aforesaid white balance adjustment must be repeated accordingly. Therefore it is very inconvenient for a camera operator as it makes photographing of TV news gathering in a short instance almost impossible.

SUMMARY OF THE INVENTION

In view of the aforesaid problem with the conventional process for compensating the color temperature for an electronic or television camera, the present invention offers a novel automatic color temperature compensating device which automatically compensates for the color temperature at any moment.

The automatic color temperature compensating device of this invention comprises three detectors provided with red, green and blue filters, respectively, so as to separate the light from the surroundings into red, green, and blue rays and to produce an electric signal in response to the red, green and blue rays respectively; three log-amplifiers each adapted to receive and amplify each electric signal; two ratio circuits each adapted to receive two of the aforesaid electric signals and to differentiate the ratio of the two electric signals; two anti-log amplifiers each adapted to receive and amplify the output signal i.e., a ratio signal, from the respective ratio circuit; two comparators each adapted to receive the output signal from the respective anti-log amplifier and compare it with a reference voltage. The comparators then each deliver a control voltage responsive to the difference between the ratio signal and the reference voltage, the control voltages being respectively delivered to two of three gain control circuits in the camera system having three color filters, three pre-amplifiers, three gain control circuits and three processing amplifiers, so as to adjust the "gain" of the respective signal in the camera system. A switch is employed between the comparators and the gain control circuits, so that the gains of the signals from three pre-amplifiers and gain control circuits can be adjusted and set equal at the color temperature of 3200° K. initially with the switch turned off. As soon as the initial adjustment, or pre-setting, is completed, the switch can be turned on and then the camera can be operated with the color temperature being automatically compensated for at any moment so that the camera system is operated as if it were at 3200° K.

Therefore, it is the main object of this invention to provide a novel automatic color temperature compensation device for an electronic or television camera, with which the color temperature response of the camera is automatically adjusted at any time to the pre-set color temperature.

It is another object of this invention to provide novel, automatic color temperature compensation device for an electric or television camera, with which there is no need to use a Gray Scale Chart after the initial setting.

BRIEF DESCRIPTION OF THE DRAWINGS

FIG. 6 is a circuit diagram of the ratio circuit employed in the device of this invention, showing the detailed electrical arrangement of $IC_2$ of FIG. 4.

FIG. 7 is a circuit diagram of the anti-log amplifier employed in the device of this invention, showing the detailed electrical arrangement of $IC_3$ and $IC_4$ of FIG. 4.

FIG. 8 is a circuit diagram of the comparator employed in the device of this invention, showing the detailed electrical arrangement of $IC_5$.

FIG. 9 is a circuit diagram of the gain controlling circuit employed in the device of this invention, showing the detailed electrical arrangement of $IC_6$ used in the gain controlling circuit 14 of FIG 3.

DETAILED DESCRIPTION OF THE INVENTION

Figure 1:
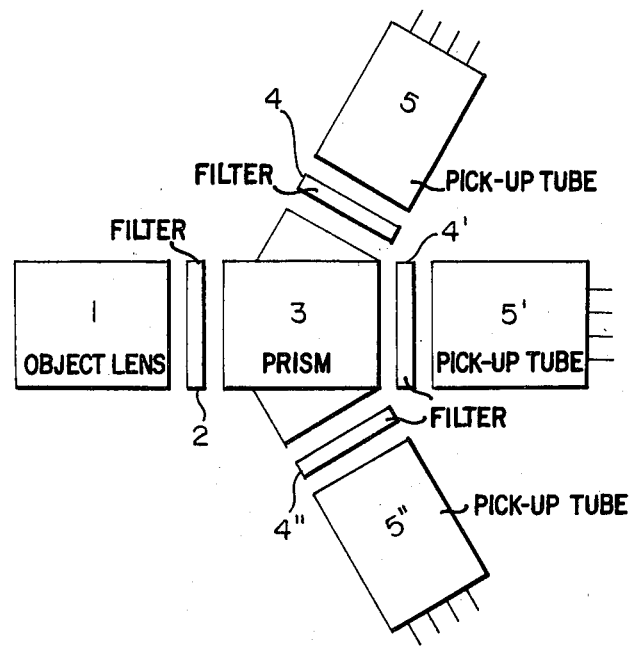
FIG. 1 is a schematic drawing showing an arrangement of a conventional three-tube color camera.
Figure 2:
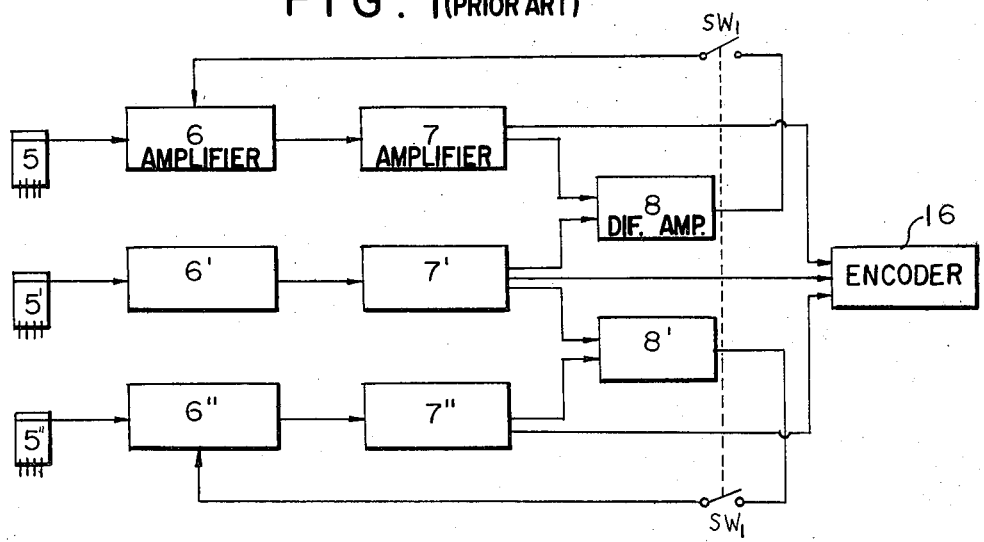
FIG. 2 is a block diagram showing the principle of the automatic white balance adjustment of a conventional color camera system.
Figure 3:
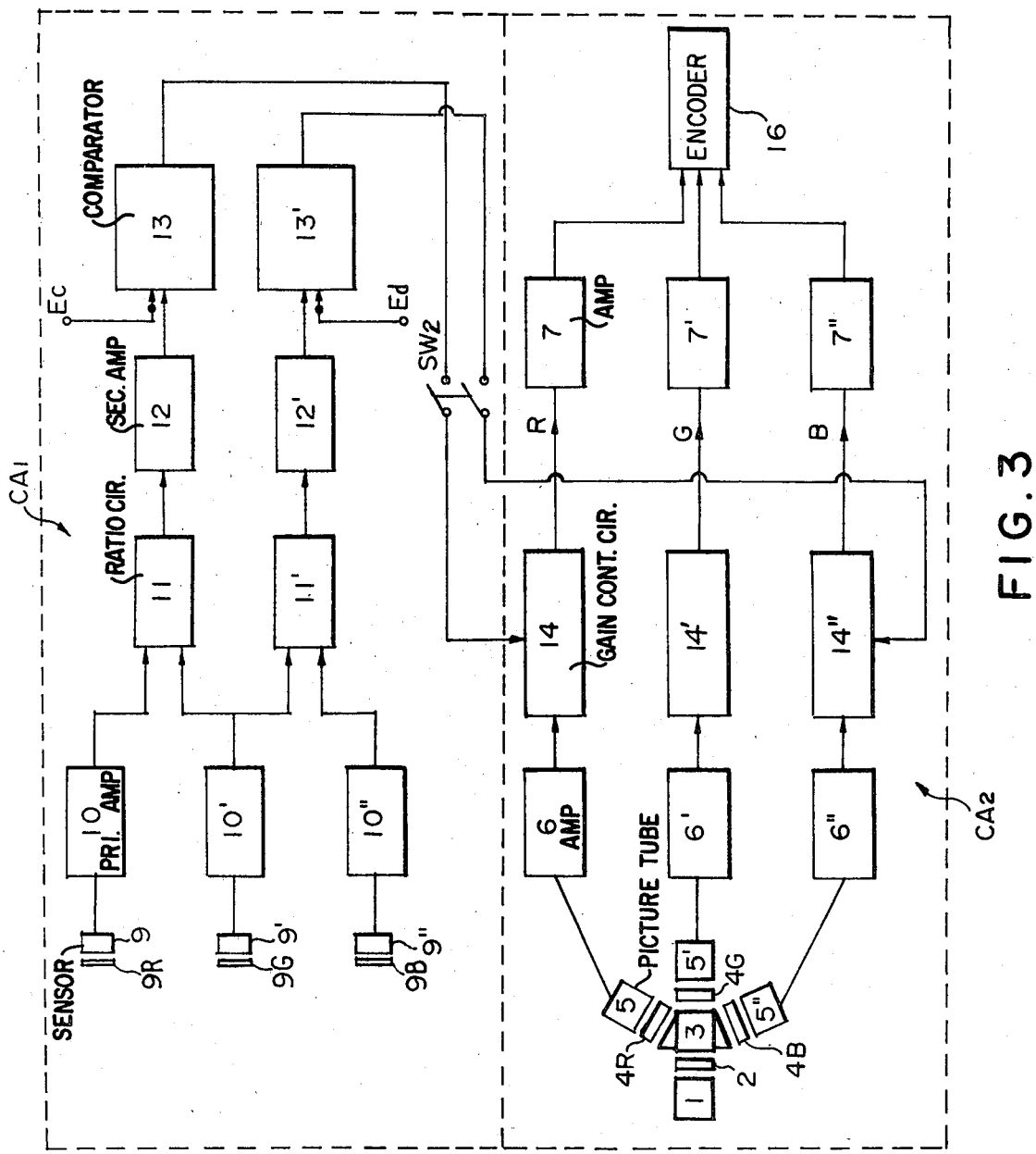
FIG. 3 is a block diagram showing the principle of the automatic color temperature compensation device of this invention.

In FIG. 3 there is shown a block diagram showing the principle of the automatic color temperature compensation device of this invention, comprising a control unit and a camera system. In the drawing, the control unit of the device of this invention is generally designated by $CA_1$ which is connected to a camera system generally designated by $CA_2$. The camera system $CA_2$ comprises an object lens 1; a filter 2; a prism 3 adapted to separate the light passing through object lens 1 and filter 2 into three components, color filters 4R, 4G, 4B respectively adapted to let through only the red, green and blue rays; three pick-up tubes 5, 5', 5" where the respective rays are received and each converted into an electrical signal; three pre-amplifiers 6, 6', 6" adapted to receive and to amplify respective electrical signals delivered by respective pick-up tubes 5, 5', 5|; three gain controlling circuits 14, 14', 14", adapted to adjust the gain of their respective amplified electrical signals; three processing amplifiers 7, 7', 7" adapted to further amplify respective electrical signals from three gain controlling circuits 14, 14', 14" and an encoder 16 adapted to combine the three amplified signals from the three processing amplifiers and to convert them into complex color video signals. The control unit $CA_1$ comprises three color filters 9R, 9G, 9B respectively adapted to only allow red, green and blue rays to pass through, three sensors 9, 9', 9" adapted to respectively receive the red, green and blue rays and to produce an electric signal in response to the respective rays received; primary amplifiers, may be log-amplifiers, 10, 10', 10" adapted to amplify the electrical signals produced by sensors 9, 9', 9"; two ratio circuits 11, 11' each adapted to compare two of the three electrical signals amplified by log-amplifiers 10, 10', 10" to produce a ratio signal in response to the two amplified electric signals compared; two secondary amplifiers, may be anti-log amplifiers 12, 12' adapted to amplify the ratio signals; two comparators 13,13' adapted to compare the amplified ratio signals with reference voltages $E_c$, $E_d$, respectively, and to deliver control signals in response to the difference between the ratio signals and the reference voltages, the control signals being delivered to gain control circuits 14, 14" of the camera system $CA_2$ through a switch $SW_2$.

In operation of the automatic color temperature compensation device as shown in FIG. 3, firstly, switch $SW_2$ is turned off and the color temperature of the studio in which the camera system $CA_2$ is to operate is set at 3200° K. Secondly, a Gray Scale Chart is photographed and gain controlling circuits 14, 14" of camera system are manually adjusted to equalize three signals R, B, G being delivered to processing amplifiers 7, 7', 7". Thirdly, switch $SW_2$ is turned on and reference voltages $E_c$ and $E_d$ are manually adjusted so that there are not output signals from comparators 13, 13' while control unit $CA_1$ is operated together with camera system $CA_2$ in the studio having the color temperature of 3200° K., and then the reference voltages are fixed to complete the initial setting.

When the color temperature in the studio changes, or the camera system having the automatic color temperature compensation device of this invention connected as shown in FIG. 3 is operated in an open field where the color temperature varies from time to time, the device of this invention will automatically produce control signals from the comparators 13, 13' and make the appropriate adjustments of gain controlling circuits 14, 14" so as to compensate for the color temperature of the light received and so that the camera system $CA_2$ can produce video signals as if it were operating at the standard color temperature of 3200° K.

While the general operational principles of the automatic color temperature compensation device of this invention have been described above, more detail will be described with reference to FIG. 4 in which the electric circuit diagram of a preferred embodiment is shown.

Figure 5:
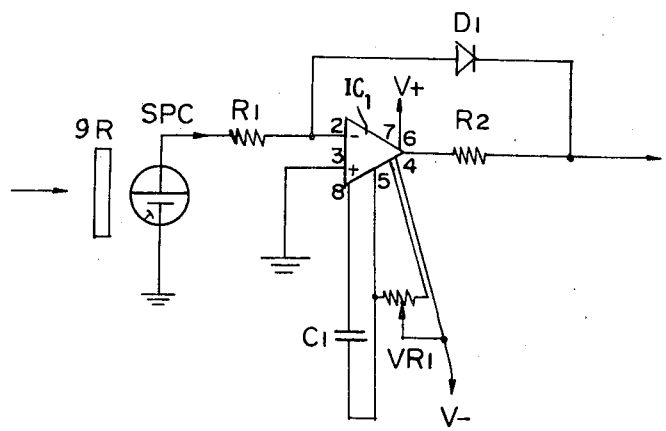
FIG. 5 is a circuit diagram of the log amplifier employed in the device of this invention, showing the detailed electrical arrangement of $IC_1$ of FIG. 4.

As shown in the drawing, the automatic color temperature compensation device of this invention comprises a red color filter 9R, green color filter 9G, blue color filter 9B; three sensors 9, 9', 9" each comprising a selenium photovoltaic cell respectively designated by $SPC_1$, $SPC_2$ and $SPC_3$, the filters and sensors being conveniently arranged to be exposed to the light from the surroundings; three log amplifiers 10, 10', 10" respectively connected to $SPC_1$, $SPC_2$, $SPC_3$ through resistors $R_1$, $R_1'$, $R_1''$; three log amplifiers 10, 10', 10"; two ratio circuits 11, 11'; two anti-log amplifiers 12, 12', and two comparators 13, 13'. Sensors 9, 9', 9" are disposed immediately behind respective filters 9R, 9G, 9B, and each having one lead grounded and another lead connected to resistors $R_1$, $R_1'$, $R_1''$; log ampligiers 10,10',10" each comprise an integrated circuit unit (hereafter as IC unit) $IC_1$, $IC_1'$, $IC_1''$, which may be a CA3130 having terminals 2, 3, 4, 5, 6, 7 and 8 and connections as shown in FIG. 5, and feed back diodes $D_1$, $D_1'$, $D_1''$, connected across terminals 2 and 6 of IC units $IC_2$, $IC_2'$ which may be a UA741 having terminals 1, 2, 3, 4, 5, 6 and 7 and connections (as shown in FIG. 6); resistors $R_{12}$ and $R_{12}''$ respectively connected across terminals 2 and 6 of $IC_2$ and $IC_2'$ wherein terminals 2 of $IC_2$ and $IC_2'$ are respectively connected to terminals 6 of $IC_1$ and $IC_1''$ with resistors $R_{11}$ and $R_{11}''$ and terminals 3 of $IC_2$ and $IC_2'$ are respectively connected to terminal 6 of $IC_1'$ with resistors $R_{11}'$, $R_{11}''$, and to ground with resistors $R_{12}'$, $R_{12}'''$, respectively.

To give specific details of FIG. 6:

$R_{11}$ is an input resistor; $R_{11}'$ is an input resistor;

$R_{12}$ is an feedback resistor; $R_{12}'$ is a division voltage resistor;

$VR_{11}$ is a bias reset variable resistor;

$IC_2$ is an IC unit, may be FAIRCHILD UA741; and

V+, V− designate power source.

Antilog amplifiers 12, 12' each comprise IC units $IC_3$, $IC_3'$ $IC_4$ and $IC_4'$ each having terminals 1, 2, 3, 4, 5, 6 and 7 and connections as shown in FIG. 7. Terminals 3 of $IC_3$ and $IC_3'$ are respectively connected to terminal 6 of IC$_2$, IC$_2'$ with resistors R$_{21}$, R$_{21}'$ (FIG. 4) respectively, and also connected to ground with resistors R$_{22}$, R$_{22}'$ respectively. Terminals 2 of IC$_3$ and IC$_3'$ are respectively grounded, and also connected to terminals 6 with diods D$_{21}$ and D$_{21}'$ respectively. Terminals 6 of IC$_3$, IC$_3'$ are further connected to terminals 2 of IC$_4$ and IC$_4'$ respectively with Diodes D$_{22}$ and D$_{22}'$ and terminals 2 of IC$_4$, IC$_4'$ are connected to terminals 6 respectively with resistors R$_{23}$, R$_{23}'$. To give specific details of FIG. 7;

R$_{21}$ is an input resistor;
R$_{22}$ is a division voltage resistor;
IC$_3$, IC$_4$ are an IC unit, may be UA741;
D$_{21}$ is a feedback diode;
D$_{22}$ is an anti-log diode;
R$_{23}$ is a feedback resistor;
V+, V− designate power source; and
VR$_{21}$, VR$_{22}$ are a bias reset variable resistor.

Comparators 13, 13' comprise IC$_5$, IC$_5'$ respectively each having terminals 1, 2, 3, 4, 5, 6 and 7 as shown in FIG. 8 taking IC$_5$ as an example; the detailed arrangement of IC$_5'$ is identical with that of IC$_5$. Terminals 2 of IC$_5$, IC$_5'$ are respectively connected to terminals 6 of IC$_4$, IC$_4'$ of antilog-amplifiers 12, 12', while the terminals 3 are respectively connected to a DC power source E$_c$, E$_d$. Terminals 6 of IC$_5$, IC$_5'$ are respectively connected to switch SW$_2$ for respectively connecting to gain controlling circuit 14, 14'' of the camera system CA$_2$. To give specific details of FIG. 8:

R$_{31}$ is an input resistor;
IC$_5$ is an IC unit, may be UA 741;
VR$_{31}$ is a bias reset variable resistor;
E$_c$ is a reference voltage which is equal to output voltage of antilog amplifier 12 at 3200° K.;
similarly,
E$_d$ is a refernce voltage which is equal to output voltage of antilog amplifier 12' at 3200° K.

FIG. 9 shows an electric circuit diagram of gain control circuit 14 comprising IC unit IC$_6$ having terminals 1, 2, 3, 4, 6, 7, 10 and 11. In this arrangement terminal 10 is connected to terminal 6 of IC$_5$ of comparator 13 with a resistor R$_{42}$ through switch SW$_2$, terminal 3 is connected to pre amplifier 6 with capacitor C$_{41}$ and terminal 7 is connected to processing amplifier 7 with capacitor C$_{44}$. To give specific details:

IC$_6$ is an IC unit, which may be SS-32;
C$_{41}$ is coupling capacitor;
C$_{42}$ is a filtering capacitor;
C$_{43}$ is a compensation capacitor;
C$_{44}$ is a output coupling capacitor;
R$_{41}$ is a bias resistor;
R$_{42}$ is an input resistor
R$_{43}$ is a bias resistor
R$_{44}$ is a compensation resistor
R$_{45}$ is an output load resistor
D$_{41}$ is an diode for protecting the circuit from the large input signals
Gain controlling circuit 14'' is identical with gain control circuit 14.

The function and operation of the automatic color temperature compensation device of this invention will now be described as follows.

Figure 4:
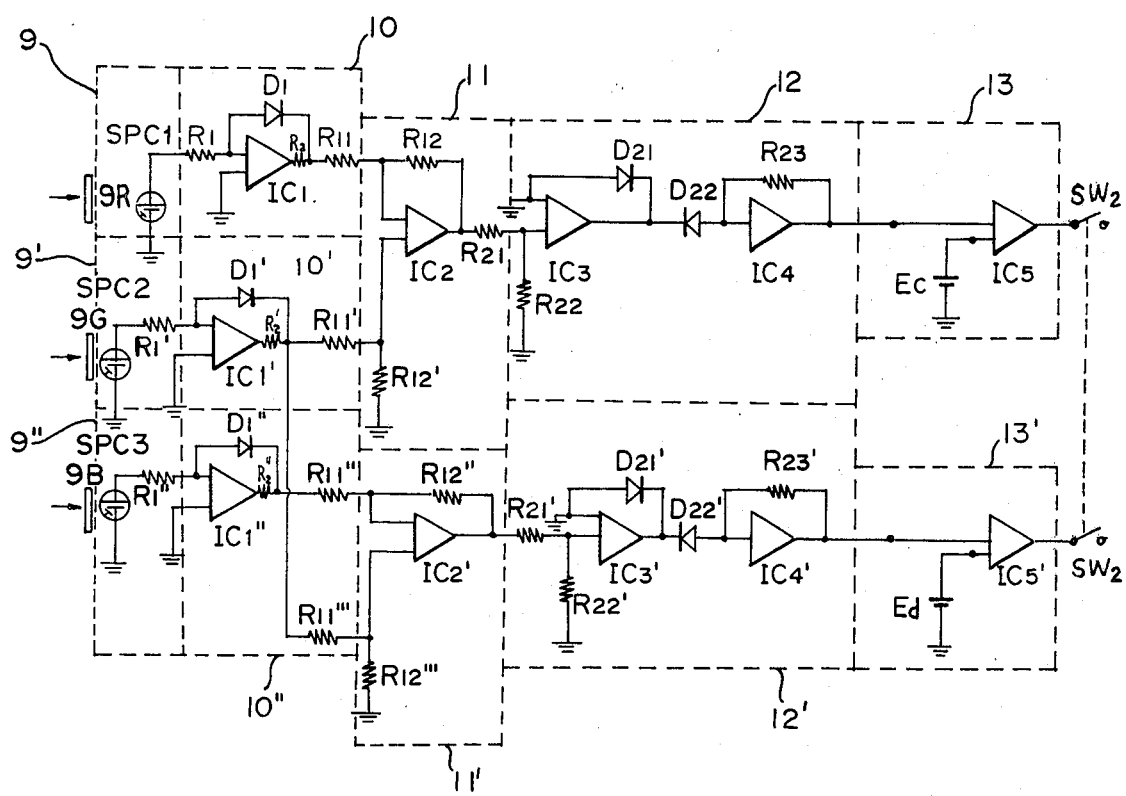
FIG. 4 is a circuit diagram of an embodiment of the device of the present invention.

Referring to FIG. 4, light from the surroundings is filtered by filters 9R, 9G and 9B and red, green and blue rays are respectively received by respective sensors SPC$_1$, SPC$_2$ and SPC$_3$, which then respectively produce electric signals responsive to the red, green and blue rays received. These electric signals are delivered to respective IC units IC$_1$, IC$_1'$ and IC$_1''$ of log-amplifiers 10, 10' and 10'' and thereby each amplified into an output voltage in the form of a logarithmic scale, so that the device is operable through a wide range of light intensities and color temperatures.

The output voltage of IC$_1$ is defined by the formula (1):

$$E_1 = -\eta V_T \left( \log \frac{e_R}{R_1} - \log I_o \right) \quad (1)$$

and that of IC$_1'$ by the formula (2)

$$E'_1 = -\eta V_T \left( \log \frac{e_G}{R'_1} - \log I_o \right) \quad (2)$$

similarly, that of IC$_1''$ by the formula (3)

$$E''_1 = -\eta V_T \left( \log \frac{e_B}{R''_1} - \log I_o \right) \quad (3)$$

wherein
V$_T$=coefficient of sensitivity of color temperature
e$_R$=output voltage of SPC$_1$,
e$_G$=output voltage of SPC$_2$,
e$_B$=output voltage of SPC$_3$,
R$_1$, R$_1'$, R$_1''$=input impedance,
I$_o$=anti saturation current;
two of above output voltages E$_1$, E$_1'$ are delivered to IC$_2$ of ratio circuit 11, and E$_1'$, E$_1''$ are deliver d to IC$_2'$ of ratio circuit 11', and the output voltages defined by the following formulas are produced by IC$_2$, IC$_2'$ respectively, $$E_2 = K_1 \log \frac{e_R}{e_G} \quad (4)$$

$$E'_2 = K_1 \log \frac{e_B}{e_G} \quad (5)$$

wherein E$_2$, E$_2'$ are respectively the output voltages from IC$_2$, IC$_2'$ and K$_1$ is a constant.

The above output voltages are delivered to anti-log amplifiers 12, 12', which in turn produce the output voltages defined by the following formulas:

$$E_4 = K_2 \frac{e_R}{e_G} \quad (6)$$

$$E'_4 = K_2 \frac{e_B}{e_G} \quad (7)$$

wherein E$_4$, E$_4'$ are output voltages from IC$_4$, IC$_4'$ respectively and K$_2$ is a constant.

The above output voltages E$_4$, E$_4'$ are delivered to IC$_5$, IC$_5'$ of comparators 13, 13'. The reference voltages E$_c$, E$_d$ which are to be determined in a pre-set procedure, are adjusted so that $$E_c = K_2 \frac{e_R}{e_G} \text{ (at 3200° K.)} \quad (8)$$

$$E_d = K_2 \frac{e_B}{e_G} \text{ (at 3200}° \text{ K.)} \quad (9)$$

In order words, when the device operates at the color temperature of 3200° K. reference voltage $E_c$ is made equal to the output voltage from anti log amplifier 12, and $E_d$ is made equal to the output voltage from anti-log amplifier 12′, so that there will be no output from each comparator 13, 13′ but there will be one when the device operates at a color temperature other than 3200° K. because $$E_c = K_2 \frac{e_R}{e_G}, \text{ and } E_d = K_2 \frac{e_B}{e_G}$$

Then reference voltages $E_c$ and $E_d$ are fixed.

The outputs from comparators 13, 13′ are delivered to gain controlling circuit 14, 14″ through switch $SW_2$.

Table 2 shows visibility ratios of the three primary color ray at various color temperatures.

TABLE 2

| Color Temp. (°K.) | Blue Ray | Green Ray | Red Ray | Light Source |
|---|---|---|---|---|
| 2,000 | 7.5% | 35% | 57.5% | Standard Candle Light, Sunset, Dawn |
| 3,000 | 18 | 36 | 46 | Tungsten Bulb |
| 4,000 | 27 | 34,5 | 38.5 | High Intensity Artifical Light |
| 5,000 | 33.8 | 32.5 | 33.7 | Average Sunlight |
| 6,000 | 38.5 | 31 | 30.5 | Sunlight at noon |
| Wave length | 452 nanometers | 528 nanometers | 629 nanometers | |

Assuming now that the reference voltages $E_c$, $E_d$ are pre-set as described above so that there is no output signal from either comparator 13 or 13′ at the color temperature of 3200° K., and then the device of this invention is operated at a color temperature of 6000° K., wherein the intensity of red ray is reduced from what it was at 3200° K., as can be readily seen from Table 2, therefore the output of the anti-log amplifier 12 is smaller than the output at 3200° K., or:

$$E_c > K_2 \frac{e_R}{e_G} \text{ (at 6000}° \text{ K.)}$$

and as a result a positive output voltage is produce by comparator 13, which is applied to terminal 10 of $IC_6$ of gain controlling circuit 14, to increase the "gain" of the signal. The increase of "gain" in gain control circuit 14 is adapted to make up or to compensate for the reduced intensity of the red ray received by the pick up tube 5 of the camera system $CA_2$.

Similarly, while at 6000° K., the intensity of blue ray is higher than that at 3200° K. (see Table 2), therefore output voltage of anti-log amplifier 12′ is larger than the reference voltage $E_d$, i.e., $$E_d < K_2 \frac{e_B}{e_G} \text{ (at 6000}° \text{ K.)}$$

and as a result, an output is produced by comparator 13′, which is applied to terminal 10 of $IC_6″$ of gain controlling circuit 14″, to decrease the "gain" of the circuit. The decrease of "gain" of gain controlling circuit 14″ is adapted to offset the increased intensity of the blue rays received by pick up tube 5″ of the camera system $CA_2$.

It is now readily apparent that the increase or decrease of the intensity of the color components, i.e., red, blue and green rays because of change of the color temperature is automatically offset or compensated for with the device of the present invention, so that the camera system is operated as if it were at the standard color temperature of 3200° K.

The camera system $CA_2$ is operable without the automatic color temperature compensation by turning off switch $SW_2$, if it is so desired.

Although specific colors of the three primary colors were designated with respect to the gain controlling circuit, however, it is to be understood that the designation of color to each gain controlling circuit may be altered among the three primary colors in such way that the color filters of the control unit $CA_1$ correspond with that of the camera system $CA_2$.

I claim:

1. An automatic color temperature compensation device for electronic cameras, comprising:
    (a) a first sensor having a first filter, said first filter adapted to pass a first color ray of light, said first sensor adapted to detect said first color ray and produce a first electrical signal in response to the detected first color ray;
    (b) a second sensor having a second filter, said second filter adapted to pass a second color ray of light, said second sensor adapted to detect said second color ray and produce a second electrical signal in response to the detected second color ray;
    (c) a third sensor having a third filter, said third filter adapted to pass a third color ray of light, said third sensor adapted to detect said third color ray and produce a third electrical signal in response to the detected third color ray;
    (d) a first ratio circuit adapted to receive and compare the first and second electrical signals and to produce a first ratio output in response to the ratio difference between said first and second electrical signals;
    (e) a second ratio circuit adapted to receive and compare the second and third electrical signals and to produce a second ratio output in response to the ratio difference between said second and third electrical signals;
    (f) a first comparator to receive the first ratio output and compare it with a first reference voltage, and to produce a first control voltage in response to the difference between said ratio output and said first reference voltage;
    (g) a second comparator to receive the second ratio output and compare it with a second reference voltage, and to produce a second control voltage in response to the difference between said second ratio output and said second reference voltage; and
    (h) a camera means including:
        a first signal means having a first filter for passing only red ray of light; a first pick-up tube capable of detecting the first color ray and producing a fourth electrical signal, a first gain controlling circuit adapted to adjust the gain of said fourth electrical signal; a second signal means having a second filter for passing a second color ray of light, a second pick-up tube capable of detecting the second color ray and producing a fifth electrical signal, and a second gain controlling circuit; and a third signal means having a third filter for passing a third color ray of light, a third pick-up tube capable of detecting the third color ray and producing a sixth electrical signal, a third gain controlling circuit adapted to adjust the gain of said sixth electrical signal;

said first comparator being electrically connected to said first gain controlling circuit through a first switch means such that said first control voltage is delivered to said first gain controlling circuit for adjusting the gain of said fourth electrical signal, and said second comparator is electrically connected to said third gain controlling circuit through a second switch means such that said second control voltage is delivered to said third gain controlling circuit for adjusting the gain of said sixth electrical signal.

2. An automatic color temperature compensation device according to claim 1, wherein said first and second reference voltages are adjustable.

3. An automatic color temperature compensation device according to claim 1, wherein said first, second and third color rays are respectively of one of the three primary colors.

4. An automatic color temperature compensation device according to claim 1 including a first amplifier means coupled to the outputs of said first sensor, second sensor and third sensor for amplifying the outputs thereof and second amplifier means coupled to the outputs of said first ratio circuit and second ratio circuit for amplifying the outputs thereof.

5. An automatic color temperature compensation device according to claim 4 wherein said first amplifier means are log-amplifiers and said second amplifier means are antilog amplifiers.

* * * * *